United States Patent [19]
Fritz et al.

[11] Patent Number: 5,813,085
[45] Date of Patent: Sep. 29, 1998

[54] MOTOR ISOLATION GASKET FOR CENTRAL VACUUM

[75] Inventors: Joel Fritz; Steven Lauritsen, both of Webster City, Iowa

[73] Assignee: White Consolidated Industries, Inc., Cleveland, Ohio

[21] Appl. No.: 810,146

[22] Filed: Feb. 25, 1997

[51] Int. Cl.$^6$ ........................................... A47L 5/38
[52] U.S. Cl. .................... 15/314; 15/326; 15/412
[58] Field of Search ................. 15/412, 326, 314

[56] References Cited

U.S. PATENT DOCUMENTS

| | | |
|---|---|---|
| 3,320,725 | 5/1967 | Foster . |
| 3,634,905 | 1/1972 | Boyd ..................................... 15/412 X |
| 4,512,713 | 4/1985 | Berfield . |
| 4,591,368 | 5/1986 | MacDuff . |
| 4,592,764 | 6/1986 | Ikezaki et al. . |
| 4,617,034 | 10/1986 | Ikezaki et al. . |
| 4,733,118 | 9/1988 | Lindquist et al. ........................ 15/326 |
| 4,733,429 | 3/1988 | Jacob et al. ............................. 15/412 X |
| 4,746,092 | 5/1988 | Hayashi et al. ......................... 15/412 X |
| 4,938,309 | 7/1990 | Emdy . |
| 5,016,316 | 5/1991 | McAllise et al. . |
| 5,068,555 | 11/1991 | Oberdorfer-Bögel . |
| 5,293,664 | 3/1994 | Lim et al. ................................ 15/326 |
| 5,400,463 | 3/1995 | Attard et al. . |
| 5,513,417 | 5/1996 | Kim et al. .............................. 15/412 X |
| 5,548,867 | 8/1996 | Hwang et al. . |

FOREIGN PATENT DOCUMENTS 1208427  10/1970  United Kingdom ..................... 15/412

*Primary Examiner*—Chris K. Moore
*Attorney, Agent, or Firm*—Pearne, Gordon McCoy & Granger LLP

[57] ABSTRACT

A central-vacuum power unit is provided having a molded rubber gasket which seals and vibrationally isolates a vacuum motor. The power unit includes a canister forming a hollow interior and a plate dividing the hollow interior into first and second chambers. The vacuum motor is located within the first chamber and has an inlet in fluid communication with the second chamber through an opening in the plate. The molded rubber gasket encircles the plate opening and seals the vacuum motor to the plate. The gasket also forms a seat for the vacuum motor and supports the vacuum motor against the plate. The gasket includes a ring-shaped main wall, a protrusion extending from the main wall and engaging an end surface of the vacuum motor, and an outer wall extending from the main wall and engaging the outer periphery of the vacuum motor. Distinct primary and secondary seals are formed by the protrusion and outer wall. The outer wall is shaped so that a seal can be obtained over a relatively short longitudinal length. The protrusion is shaped so that the end surface of the vacuum motor can be either flat or concave.

20 Claims, 5 Drawing Sheets

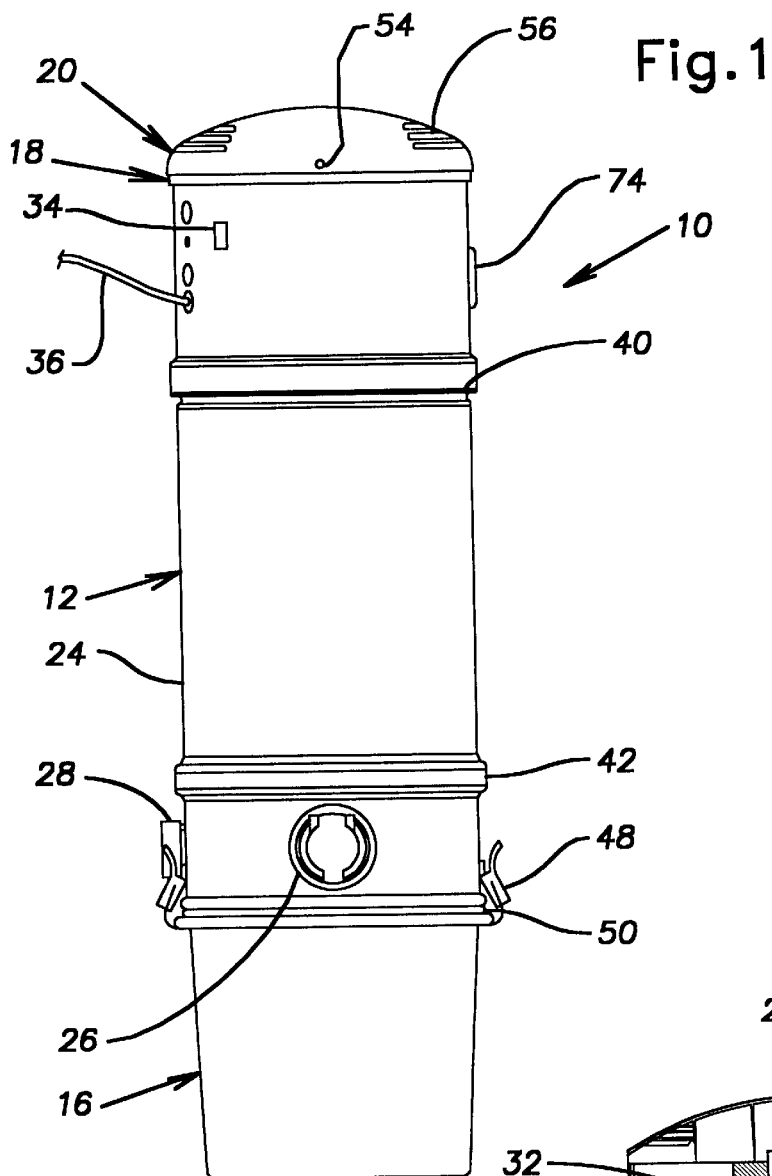
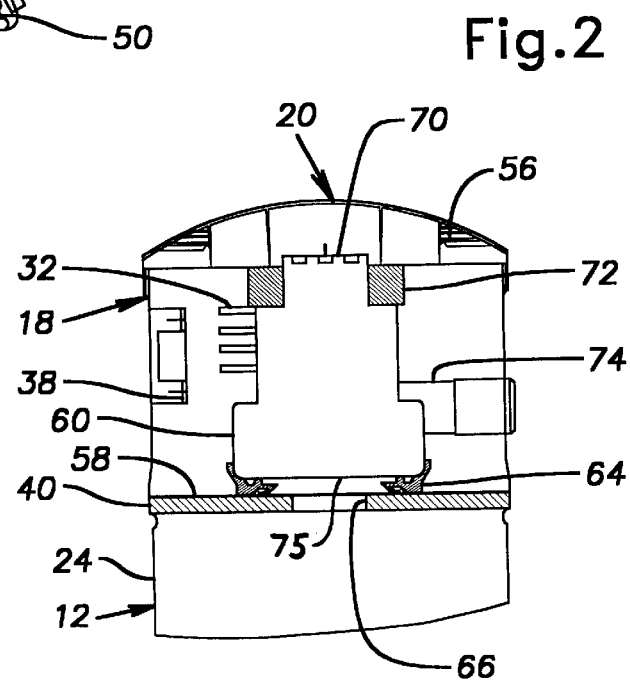

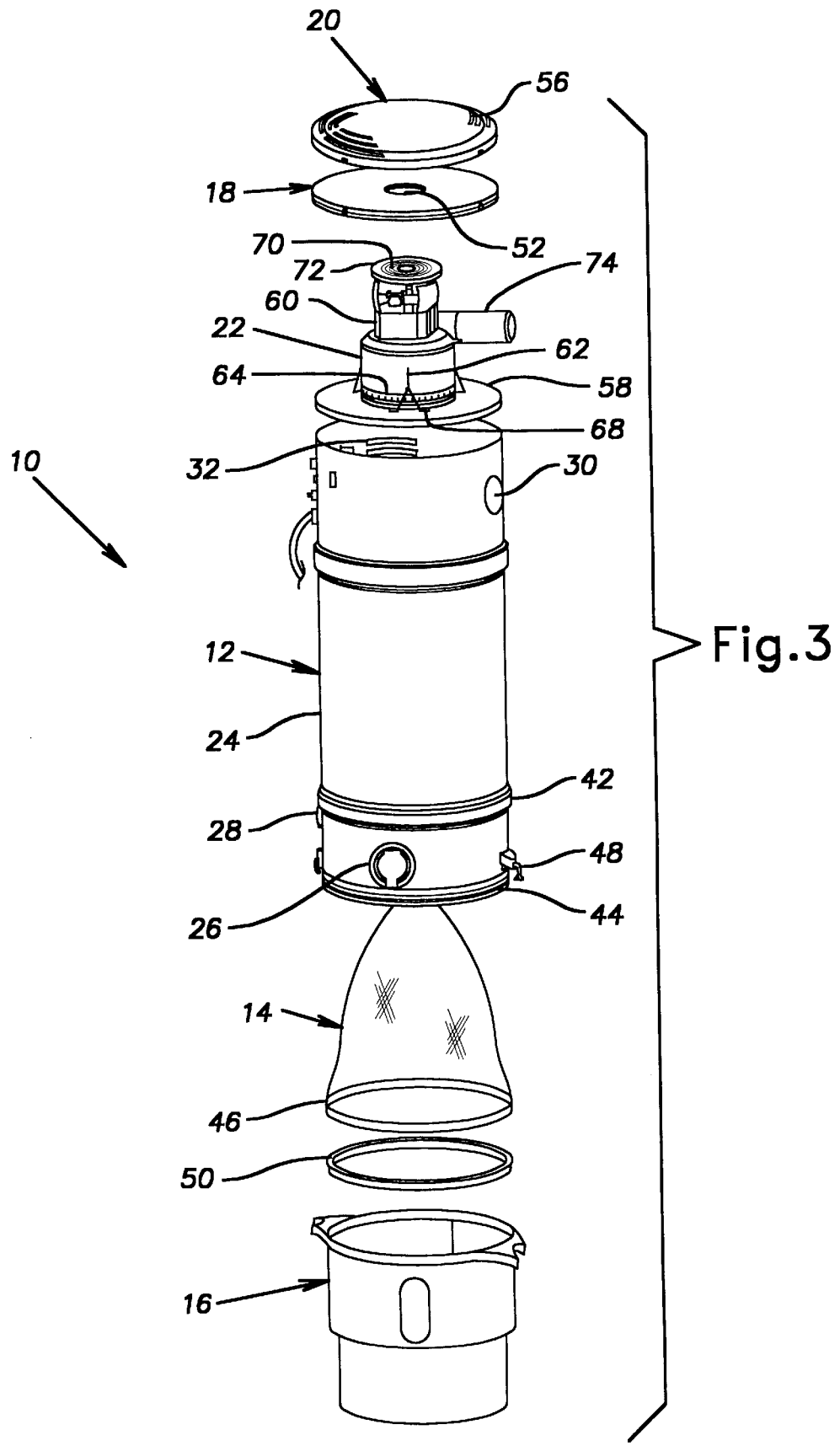

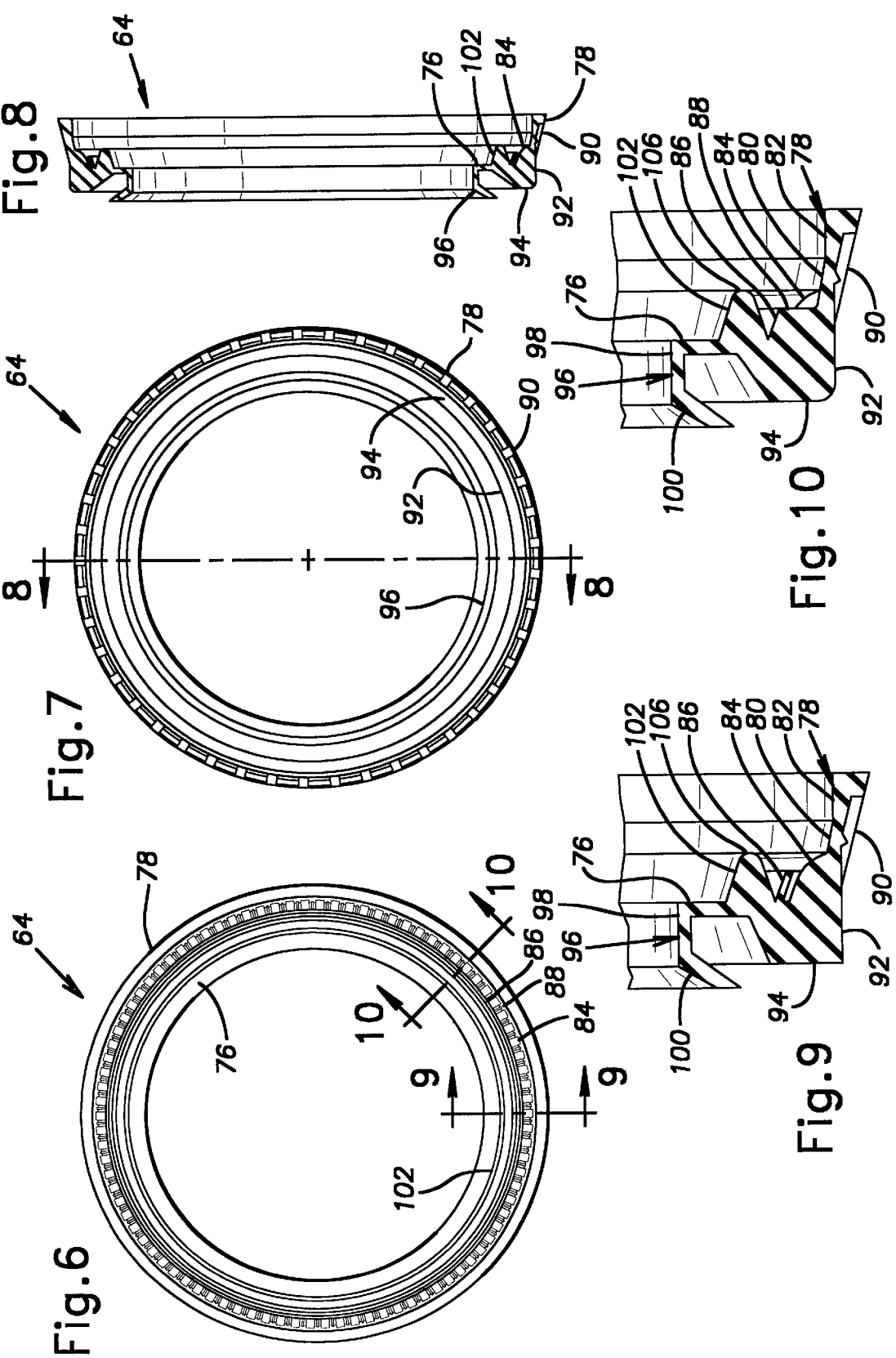

MOTOR ISOLATION GASKET FOR CENTRAL VACUUM

BACKGROUND OF THE INVENTION

The present invention relates in general to a central-vacuum power unit and, more particularly, to a motor isolation gasket for the central-vacuum power unit.

Built-in or central vacuum systems typically have a central-vacuum power unit and a system of vacuum ducts which extend into various rooms of the house. Vacuum inlets are located in walls of selected rooms so that a vacuum hose can be connected to the central vacuum unit. When not in use, the vacuum inlets are covered by plates. To use the central vacuum system, one of the vacuum inlets is opened and the vacuum hose is plugged into the inlet. The central vacuum unit is automatically activated and a suction force draws in dirt and dust through a nozzle attached to the end of the vacuum hose. The central vacuum system provides more cleaning power than conventional portable vacuum cleaners and reduces the necessity of carrying portable vacuum cleaners from room to room. Additionally, the central vacuum system vents exhaust air out of the living area to eliminate the recirculation of unhealthy air.

One major disadvantage of built in vacuum systems of the prior art, however, is the creation of a substantial amount of noise by the central vacuum unit. Much of noise is due to vibration of the vacuum motor which is transferred to the wall of the canister. Typically, the motor is secured against a mounting surface with compression springs to isolate the motor from the canister. A flat neoprene gasket is positioned between the motor and the mounting surface to both seal the motor and to provide vibration isolation. Vibrations, however, are still transferred from the motor to the canister. Additionally, the flat neoprene gasket is often permanently deformed and must be replaced. Furthermore, the flat neoprene gasket does not always provide an adequate seal. Accordingly, there is a need in the art for a built-in vacuum cleaning system which improves motor isolation, eliminates permanent gasket deformation, and improves motor sealing.

SUMMARY OF THE INVENTION

The present invention provides a central-vacuum power unit which overcomes at least some of the above-noted problems. The central vacuum unit includes a canister forming a hollow interior and a plate within the canister which has an opening. The plate divides the hollow interior of the canister into first and second chambers. A vacuum motor is within the first chamber and has an inlet in fluid communication with the second chamber through the opening in the plate. The vacuum motor has an end surface generally facing the plate. A gasket encircles the opening and the inlet and seals the motor to the plate. The gasket includes a ring-shaped main wall and a protrusion extending from the main wall toward and engaging the end surface of the vacuum motor. The protrusion enables a seal to be formed with the lower end of vacuum motors having different shapes such as flat or concave.

According to a different aspect of the invention, a wall extends from the main wall and has a surface engaging the outer periphery of the vacuum motor. At least a portion of the surface is cylindrically shaped. The cylindrical shape of the surface enables a seal to be obtained over a relatively short longitudinal length of the vacuum motor. Preferably, separate first and second seals are obtained between the gasket and the vacuum motor by the protrusion and the wall respectively. Preferably, the gasket is molded of a rubber material having a durometer which both eliminates permanent deformation and improves vibration isolation.

BRIEF DESCRIPTION OF THE DRAWINGS

These and further features of the present invention will be apparent with reference to the following description and drawings, wherein:

FIG. 1 is a front elevational view of a central-vacuum power unit according to the present invention;

FIG. 2. is a fragmented and enlarged view, partially in cross-section, of a top portion of the central-vacuum power unit of FIG. 1;

FIG. 3 is an exploded view of the central-vacuum power unit of FIG. 1;

FIG. 6 is a top view of the isolation gasket of the central-vacuum power unit of FIG. 1;

FIG. 7 is a bottom view of the isolation gasket of FIG. 6;

FIG. 8 is a cross-sectional view taken along line 8—8 of FIG. 7 showing a full cross-section of the isolation gasket;

FIG. 9 is a cross-sectional view taken along line 9—9 of FIG. 6 showing a partial cross-section of the isolation gasket; and FIG. 10 is a cross-sectional view taken along line 10—10 of FIG. 6 showing a partial cross-section of the isolation gasket.

DETAILED DESCRIPTION OF THE PREFERRED EMBODIMENT

Figure 4:
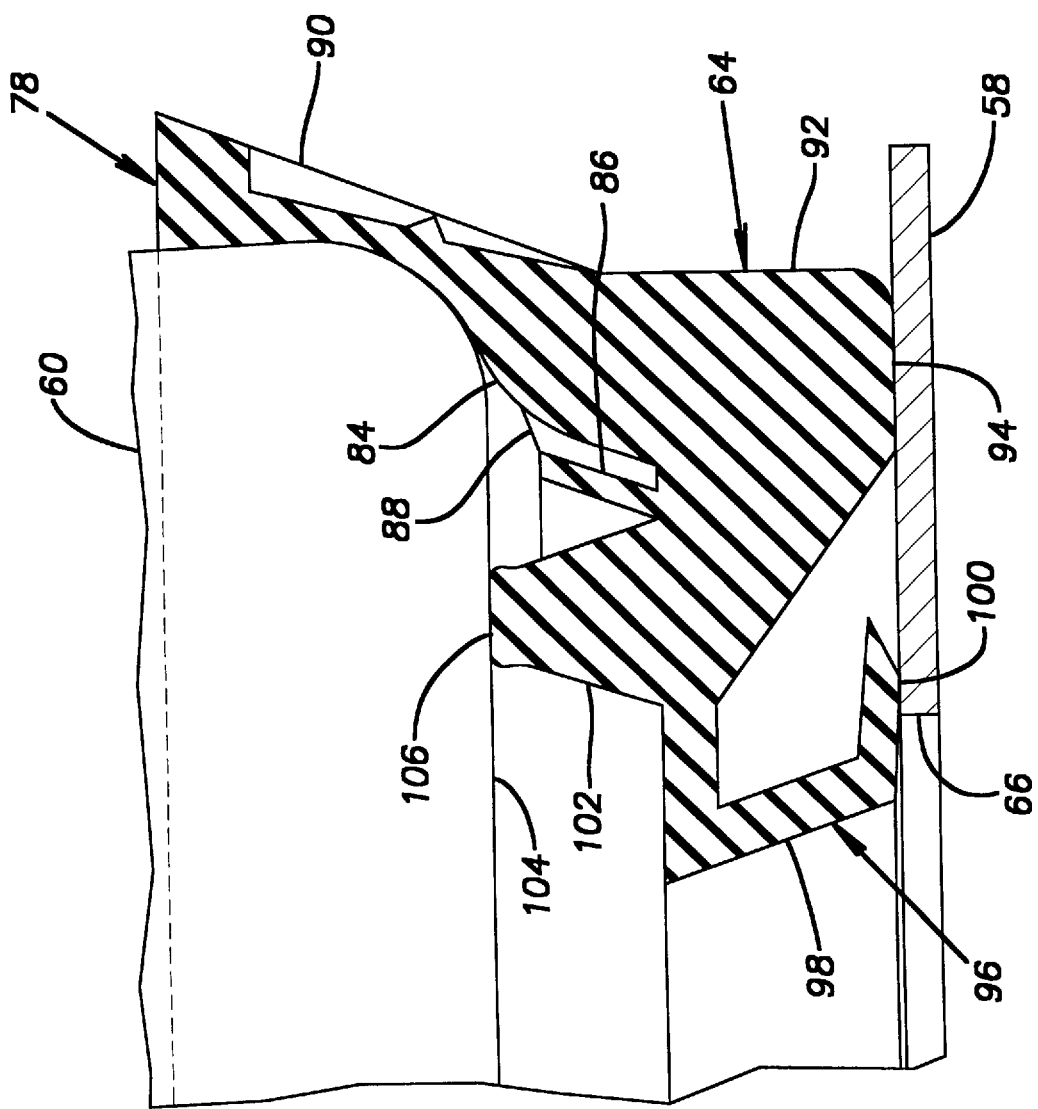
FIG. 4 is a fragmented and enlarged view, partially in cross-section, of a portion of FIG. 2 showing an interface between a motor isolation gasket and a vacuum motor of the central-vacuum power unit.

FIGS. 1–4 illustrate a central-vacuum power unit 10 according to the present invention. The central-vacuum power unit 10 includes an upper cylinder or canister 12, a filter or collection bag 14, a lower cylinder or bucket 16, an upper plate or lid 18, a canopy 20, and a vacuum motor assembly 22.

The canister 12 has a generally cylindrically-shaped side wall 24 which forms a hollow interior space having open upper and lower ends. The canister 12 is preferably rolled from steel or other suitable materials. The side wall 24 is provided with a pair of vacuum-intake ports 26, 28 each located near the bottom of the side wall 24. A vacuum-exhaust opening 30 and a cooling-air outlet 32 are each located near the top of the canister 12. The cooling-air outlet 32 is preferably a plurality of parallel and spaced-apart slots.

The canister 12 is also provided with suitable openings for an on-off switch 34 and a power cord 36 each near the top of the side wall 24. The on-off switch 34 is attached to the side wall 24 and is operatively connected to an electrical control board 38 located within the canister 12. The power cord 36 extends through the side wall 24 and is operatively connected to the electrical control board 38 so that the central-vacuum power unit 10 can be connected to a conventional electrical power source (not specifically shown).

The interior surface of the canister 12 is provided with an annular-shaped ledge 40 formed by an inwardly extending recess or groove formed in exterior surface of the side wall 24. The ledge 40 is longitudinally located below the vacuum-exhaust opening 30 and the cooling-air outlet 32 and is spaced, from the top of the side wall 24, a distance adequate for supporting the vacuum-motor assembly 22 within the hollow interior. The interior surface of the canister 12 is also provided with an outwardly extending recess or groove 42 formed in the interior surface of the side wall 12. The groove 42 is located generally near the bottom of the side wall 24 and above the vacuum-intake ports 26, 28. The exterior surface of the canister 12 is provided with an inwardly extending recess or groove 44 formed at the bottom edge of the side wall 24.

The collection bag 14 is housed within the hollow interior space of the canister 12. The collection bag 14 has an opening provided with a flexible ring or rim 46. The flexible rim 46 rests within the groove 42 formed in the interior surface of the side wall 24 of the canister 12. The flexible rim 46 secures the collection bag 14 to the side wall 24 and generally seals the collection bag 14 to the side wall 224 so that air passing through the canister 12 must pass through the collection bag 14. The collection bag 14 includes an air permeable material which substantially prevents dirt and dust from passing therethrough.

The bucket 16 has a generally cylindrically-shaped side wall and a bottom wall at the bottom of the side wall which together form a hollow interior space having an open upper end and a closed lower end. The bucket 16 is preferably molded plastic or other suitable material. The open end of the bucket 16 is removably attached to the open bottom end of the canister 12 by means such as the illustrated quick-release clips 48 to close the open bottom end of the canister 12. A gasket 50 rests in the groove 44 formed in the exterior surface of the canister sidewall 24 to obtain a substantially air-tight seal between the canister 12 and the bucket 16.

The upper lid 18 is sized and shaped to generally close the open top end of the canister 12. The upper lid 18 is provided with a central inlet or opening 52 for cooling air. The upper lid 18 is preferably formed from steel or other suitable material. The upper lid 18 is removable secured to the top of the canister side wall 24 by removable fasteners 54 such as, for example, screws.

The canopy 20 is attached to the top of the central-vacuum power unit 10 and generally encloses the central opening 52 in the upper lid 18. The canopy 20 is preferably molded of a plastic material such as, for example, an ABS plastic. A plurality of cooling-air inlets 56 are provided in a dome portion of the canopy 20. The inlets 56 are preferably a plurality of parallel and spaced-apart slots. The inlets 56 are positioned so that there is generally not a direct pathway from the central opening 52 of the upper lid 18 to the inlets 56 of the canopy 20 to reduce noise emitted from the central-vacuum power unit 10 through the central opening 52. The canopy 20 is secured to the top of the canister side wall 24 by the same fasteners 54 which secure the upper lid 18. Alternatively, separate fasteners can be used or the canopy 20 can be integral with the upper lid 18.

The vacuum-motor assembly 22 includes a partition or mounting plate 58, a vacuum motor 60, spring elements 62, and an isolation gasket 64. The mounting plate 58 is sized and shaped for resting on the ledge 40 formed in the interior surface of the canister sidewall 24 and forming a generally tight fit therewith. The mounting plate 58 is provided with a central opening 66 therein and a plurality of brackets 68. The brackets 68 extend upwardly from the top surface of the mounting plate 58 and are equally spaced about the central opening 66. The vacuum motor 60 is secured to the top of the mounting plate 58 by the spring elements 62 which extend from the vacuum motor 60 to the brackets 68. The spring elements 62 resiliently secure the vacuum motor 60 against the top surface of the mounting plate 58. The resiliency of the spring elements 62 vibrationally isolates the vacuum motor 60 from the mounting plate 58 and thus the canister 12.

The vacuum motor 60 has a cooling-air inlet 70 at a top end thereof. The vacuum motor 60 extends from the mounting plate 58 to the upper lid 18 so that the cooling-air inlet 70 of the vacuum motor 60 is in fluid flow communication with the central opening 52 and preferably is at or through the central opening 52 in the upper lid 18. Therefore, the cooling-air inlet 70 of the vacuum motor 60 is in fluid-flow communication with the exterior space surrounding the canister 12. A seal member or gasket 72 is preferably provided between the top end of the vacuum motor 60 and the upper lid 18 to both seal the central opening 52 and thermally isolate the vacuum motor 60 from the upper lid 18. Preferably, the gasket 72 comprises an open cell foam material.

The vacuum motor 60 has a cooling-air fan (not specifically shown) which draws cooling air through the cooling-air inlet 70 of the vacuum motor 60 from the exterior space surrounding the canister 12, over relatively hot armatures of the vacuum motor 60, into the hollow interior space of the canister 12, and out of the canister 12 through the cooling-air outlet 32 in the side wall 24 of the canister 12. The cooling air thus flows over and cools the armatures of the vacuum motor 60.

The vacuum motor 60 has a vacuum-exhaust pipe 74 which provides an exit for hot exhaust coming from the vacuum motor 60. The vacuum-exhaust pipe 74 extends from a central portion of the vacuum motor 60 to the vacuum-exhaust opening 30 in the sidewall 24 of the canister 12. Preferably, a gasket or seal member (not specifically shown) is provided to obtain a substantially air-tight seal between the vacuum-exhaust pipe 74 and the side wall 24 of the canister 12.

The vacuum motor 60 also has a vacuum inlet 75 at a bottom end thereof. The vacuum inlet 75 of the vacuum motor 60 is in fluid flow communication with the central opening 66 in the mounting plate 58. As best shown in FIGS. 2 and 4, the isolation gasket 64 is located between the vacuum motor 60 and the mounting plate 58 to form a substantially air-tight seal therebetween and to vibrationally isolate the vacuum motor 60 from the mounting plate 58 and thus the canister 12.

As best shown in FIGS. 6–10, the isolation gasket 64 is ring shaped and has a annular-shaped main wall 76. Upwardly extending from the outer end of the main wall 76 is a generally cylindrical outer wall 78. The outer wall 78 is sized and shaped for encircling the outer periphery of the vacuum motor 60 and obtaining a substantially air-tight seal therewith. Preferably, the outer wall 78 has a first or lower portion 80 with an inner surface which angles outwardly in a direction away from the main wall 76 and a second or upper portion 82 with an inner surface which is substantially straight or vertical.

Upwardly extending from the main wall 76 to the lower portion 80 of the outer wall 78 are a plurality of circumferentially spaced-apart support ribs 84. The support ribs 84 are sized and shaped to form, along with the lower portion 80 of the outer wall 78, a seat for receiving and supporting the lower end of the vacuum motor 60.

Upwardly extending from the main wall 76, radially inward of the support ribs 84, is a stiffening wall or leg 86. The stiffening leg 86 angles outwardly in a direction away from the main wall 76. The stiffening leg 86 is connected to the lower portion 80 of the outer wall 78 with a plurality of circumferentially spaced-apart ribs or gussets 88 which extend between the support ribs 84 (best shown in FIG. 6). The stiffening leg 86 and gussets 88 are sized and shaped to stiffen and support the outer wall 78 without contacting the vacuum motor 60.

An additional plurality of circumferentially spaced-apart ribs or gussets 90 are located on the outer surface of the outer wall 78. There is one gusset 90 for every two of the support ribs 84 and the gussets 90 are circumferentially-aligned with alternating ones of the support ribs 84. The gussets 90 are sized and shaped to add stiffness to the outer wall 78.

Downwardly extending from the outer end of the main wall 76 is a bottom wall or protrusion 92. The bottom protrusion 92 has a substantially straight or flat lower surface 94 for engaging the mounting plate 58 (FIG. 4). The bottom protrusion 92, along with the lower surface 94, is sized and shaped for both supporting the vacuum motor 60 on the mounting plate 58 and providing a substantially air-tight seal with the mounting plate 58.

Downwardly extending from the inner edge of the main wall 76 is a bottom leg 96. The bottom leg 96 has a first or upper portion 98 and a second or lower portion 100. The upper portion 98 extends from the main wall 76 and is generally cylindrical. The lower portion 100 extends from the lower end of the upper portion 98 and is generally frusto-conically shaped. The lower portion 100 angles outwardly in a direction away from the main wall 76. The bottom leg 96 is sized and shaped to engage and provide a substantially-air tight seal with the mounting plate 58 near the central opening 66 of the mounting plate 58 (FIG. 4).

Upwardly extending from the main wall 76 inward of the stiffening leg 86 is a top leg or protrusion 102. The top protrusion 102 is sized and shaped to engage and provide a substantially air-tight seal with a bottom surface 104 (FIG. 4) of the vacuum motor 60. Preferably, the top protrusion relatively rigid, such as having a generally triangular-shape in cross-section, to provide additional support to the vacuum motor 60. The top protrusion 102 also preferably has a generally round upper or engagement end 106 to obtain a substantially fluid-tight seal with surfaces having different shapes.

The isolation gasket 64 is preferably molded from a rubber compound. Preferably, the rubber compound has a durometer of about 45 or other suitable durometer which both reduces mechanical vibrations transmitted to the structure and prevents permanent compressive deformation.

As best shown in FIG. 4, the vacuum motor 60 is within the isolation gasket 64 and is primarily supported by the support ribs 84. A first fluid-tight seal between the isolation gasket 64 and the vacuum motor 60 is provided by the top protrusion 102 of the isolation gasket 64. The top protrusion 102 engages the bottom surface 104 of the vacuum motor 60, which is generally planar, to form the first seal. The top protrusion 102 also provides additional support for the vacuum motor 60. A second fluid-tight seal between the isolation gasket 64 and the vacuum motor 60 is provided by the outer wall 78 of the isolation gasket 64. The outer wall 78 engages the bottom of the outer circumference of the vacuum motor 60 to form the second seal. It is noted that the shape of the lower and upper portions 80, 82 (FIGS. 9 and 10) of the outer wall 78 provide a fluid-tight seal with the vacuum motor 60 over a limited longitudinal length of the vacuum motor 60.

A first fluid-tight seal between the isolation gasket 64 and the mounting plate 58 is provided by the bottom leg 96 of the isolation gasket 64. The lower portion 100 of the bottom leg 96 engages the top surface of the mounting plate 58 around the circumference of the central opening 66 to form the first seal. A second fluid-tight seal between the isolation gasket 64 and the mounting plate 58 is provided by the bottom protrusion 96 of the isolation gasket 64. The lower surface 94 of the bottom protrusion 92 engages the top surface of the mounting plate 58 to form the second seal. The bottom protrusion 92 also supports the vacuum motor 60 on the mounting plate 58. Therefore, distinct and separate primary and secondary seals are formed between the isolation gasket 64 and each of the vacuum motor 60 and the mounting plate 58.

During assembly of the vacuum motor assembly 22, the lower end of the vacuum motor 60 is placed into the isolation gasket 64 so that the outer wall 78 encircles the outer circumference of the vacuum motor 60 and both the support ribs 84 and the top protrusion 102 engage the bottom surface 104 of the vacuum motor 60. The vacuum motor/ isolation gasket subassembly is then placed on the top surface of the mounting plate 58 with the isolation gasket 64 encircling the central opening 66. The vacuum motor/ isolation gasket subassembly is then actively drawn against the mounting plate 58 by attaching the compression spring elements 62 between the vacuum motor 60 and the brackets 68 of the mounting plate 58. The vacuum motor assembly 22 is then ready for assembly into the central vacuum unit 10.

Figure 5:
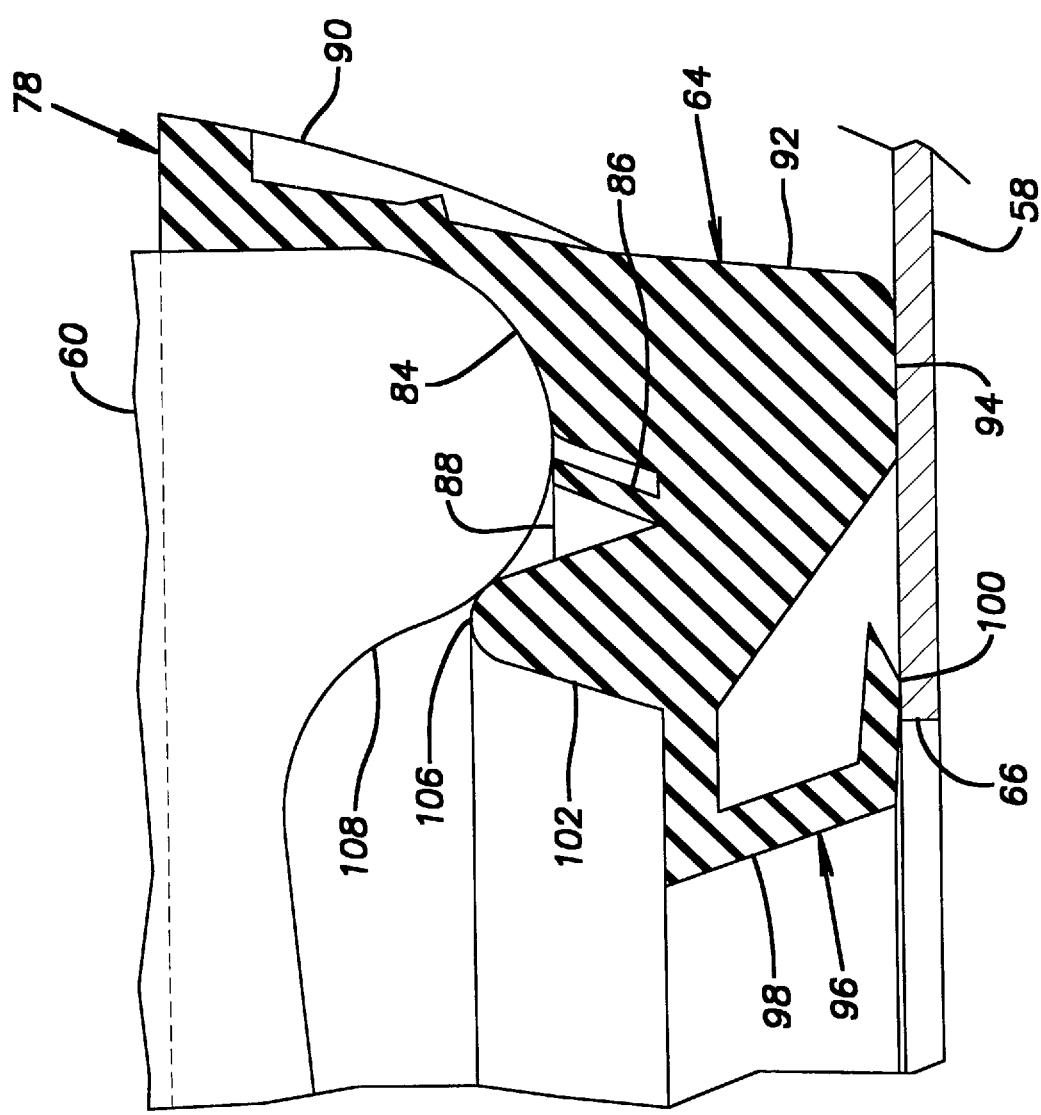
FIG. 5 is a fragmented and enlarged view, partially in cross-section, similar to FIG. 4 but showing a variation of the vacuum motor.

FIG. 5 illustrates a variation of the vacuum motor 60 wherein the bottom surface 108 of the vacuum motor 60 is generally concave. The engagement end 106 of the top protrusion 102 engages the concave bottom surface 108 of the vacuum motor 60 to obtain the first fluid-tight seal between the isolation gasket 64 and the vacuum motor 60. It is apparent, therefore, that the upper protrusion 102 enables the isolation gasket 64 to obtain a fluid-tight seal with surfaces having different shapes so that a single isolation gasket 64 can be utilized with different types of vacuum motors 60.

As best shown in FIGS. 1–3, the mounting plate 58 divides the hollow interior of the canister 12 into a first or lower compartment or chamber and a second or upper compartment or chamber. The lower chamber is formed within the hollow interior of the canister 12 by the mounting plate 58, the side wall 224 of the canister 12, and the bucket 16. The collection bag 14 is housed within the lower chamber. The upper chamber is formed within the hollow interior of the canister 12 by the mounting plate 58, the side wall 24 of the canister 12, and the upper lid 18. The vacuum motor 60 is housed within the upper chamber.

When power is supplied to the vacuum motor 60, suction created by the vacuum motor 60 causes a flow of air into the vacuum-intake ports 26, 28 of the canister 12, through the collection bag 14 within lower interior chamber of the canister 12, through the central opening 66 of the mounting plate 58, and directly into the vacuum inlet 75 of the vacuum motor 60. The air is exhausted from the vacuum motor 60 through the vacuum-exhaust pipe 74 of the vacuum motor 60 to the external space surrounding the canister 12. Dirt, dust and other debris entrained within the flow of air is blocked by the collection bag 14 and settles into the bucket 16. When the bucket 16 is full of debris, the snap clips 48 are opened and the bucket 16 is removed from the canister 12 so that the bucket 16 can be emptied.

It is apparent from the above description that the isolation gasket 60 provides support for the vacuum motor 60, seals the vacuum motor 60 with distinct primary and secondary air-tight seals, reduces mechanical vibrations transmitted from the vacuum motor 60 to the structure, and prevents permanent compressive deformation.

Although particular embodiments of the invention have been described in detail, it will be understood that the invention is not limited correspondingly in scope, but includes all changes and modifications coming within the spirit and terms of the claims appended hereto.

What is claimed is:

1. A central-vacuum power unit comprising:
   a canister forming a hollow interior;
   a plate within said canister and dividing said hollow interior into first and second chambers, said plate having an opening;
   a vacuum motor vertically extending within said first chamber and having an inlet in fluid communication with said second chamber through said opening of said plate, said vacuum motor having an end surface generally facing said plate; and
   a gasket-encircling said opening and said inlet and sealing said motor to said plate, said gasket including a ring-shaped main wall, a flexible seat extending from said main wall toward and supporting said vacuum motor, and a protrusion extending from said main wall toward and engaging said end surface of said vacuum motor to form a seal therebetween, wherein said protrusion is located radially inward and spaced apart from said seat, wherein said gasket is molded of a rubber compound having a durometer of about 45.

2. A central-vacuum power unit comprising:
   a canister forming a hollow interior;
   a plate within said canister and dividing said hollow interior into first and second chambers, said plate having an opening;
   a vacuum motor vertically extending within said first chamber and having an inlet in fluid communication with said second chamber through said opening of said plate, said vacuum motor having an end surface generally facing said plate; and
   a gasket encircling said opening and said inlet and sealing said motor to said plate, said gasket including a ring-shaped main wall, a flexible seat extending from said main wall toward and supporting said vacuum motor, and a protrusion extending from said main wall toward and engaging said end surface of said vacuum motor to form a seal therebetween, wherein said protrusion is located radially inward and spaced apart from said seat, wherein said gasket includes a wall extending from said main wall and having a surface engaging said outer periphery of said vacuum motor to form a seal therebetween.

3. A central-vacuum power unit comprising:
   a canister forming a hollow interior;
   plate within said canister and dividing said hollow interior into first and second chambers, said plate having an opening;
   a vacuum motor within said first chamber and having an inlet in fluid communication with said second chamber through said opening of said plate, said vacuum motor having an end surface generally facing said plate; and
   a gasket encircling said opening and said inlet and sealing said motor to said plate, said casket including a ring-shaped main wall and a protrusion extending from said main wall toward and engaging said end surface of said vacuum motor, wherein said protrusion is generally triangular-shaped in cross section.

4. The central vacuum power unit according to claim 3, wherein said protrusion has a generally rounded end facing said end surface of said vacuum motor.

5. A central-vacuum power unit comprising:
   a canister forming a hollow interior;
   a plate within said canister and dividing said hollow interior into first and second chambers, said plate having an opening;
   a vacuum motor within said first chamber and having an inlet in fluid communication with said second chamber through said opening of said plate, said vacuum motor having an end surface generally facing said plate; and
   a gasket encircling said opening and said inlet and sealing said motor to said plate, said gasket including a ring-shaped main wall and a protrusion extending from said main wall toward and engaging said end surface of said vacuum motor, wherein said end surface of said vacuum motor is generally concave.

6. A central-vacuum power unit comprising:
   a canister forming a hollow interior;
   a plate within said canister and dividing said hollow interior into first and second chambers, said plate having an opening;
   a vacuum motor vertically extending within said first chamber and having an inlet in fluid communication with said second chamber through said opening of said plate, said vacuum motor having a generally circular outer periphery; and
   a gasket encircling said opening and said inlet and engaging said vacuum motor and said plate to form a seal therebetween, said gasket including a ring-shaped main wall and a wall extending from said main wall and having a surface engaging said outer periphery of said vacuum motor to form a seal therebetween, wherein at least a portion of said surface is cylindrically shaped and at least a portion of said surface is frusto-conically-shaped when said gasket is removed from engagement with said vacuum motor.

7. The central-vacuum power unit according to claim 6, wherein said wall extends from a radially outer end of said main wall and a side facing said motor.

8. The central-vacuum power unit according to claim 7, wherein said surface is on a radially inner side of said wall.

9. The central-vacuum power unit according to claim 6, wherein said frusto-conically-shaped portion of said surface is between said cylindrically-shaped portion of said surface and said main wall.

10. The central-vacuum power unit according to claim 6, wherein said wall is sized and shaped to have an interference fit with said outer periphery of said vacuum motor.

11. The central-vacuum power unit according to claim 6, wherein said gasket is molded of a rubber compound.

12. The central-vacuum power unit according to claim 11, wherein said rubber compound has a durometer of about 45.

13. The central-vacuum power unit according to claim 6, wherein said gasket further includes a protrusion extending from said main wall toward and engaging said end surface of said vacuum motor to form a seal therebetween.

14. The central vacuum power unit according to claim 13, wherein said end surface of said vacuum motor is generally concave.

15. The central vacuum power unit according to claim 6, wherein said gasket includes a flexible seat extending from said main wall toward and supporting said vacuum motor.

16. A central-vacuum power unit comprising:
   a canister forming a hollow interior;

a plate within said canister and dividing said hollow interior into first and second chambers, said plate having an opening;

a vacuum motor vertically extending within said first chamber and having inlet in fluid communication with said second chamber through said opening of said plate, said vacuum motor having an end surface generally facing said plate and a circular outer periphery; and a molded rubber gasket encircling said opening and said inlet and sealing said motor to said plate, said gasket including a ring-shaped main wall, a flexible seat extending from said main wall toward and supporting said vacuum motor, a protrusion extending from said main wall toward and engaging said end surface of said vacuum motor to form a first seal therebetween, wherein said protrusion is radially inward and spaced apart from said seat, another protrusion extending from said main wall toward and engaging said plate, and an outer wall extending from said main wall toward said vacuum motor, said outer wall having an inner surface engaging said outer periphery of said vacuum motor to form a second seal therebetween.

17. The central vacuum power unit according to claim 16, wherein at least a portion of said inner surface of said outer wall is cylindrically shaped when said gasket is removed from engagement with said vacuum motor.

18. A gasket for sealing a vacuum motor of a central-vacuum power unit, said motor having a generally circular outer periphery and an end surface, said gasket comprising:

a ring-shaped main wall;

a flexible seat extending from said main wall for supporting the vacuum motor;

a protrusion extending from said main wall radially inward and spaced apart from said seat for engaging the vacuum motor end surface and forming a first seal therebetween; and an outer wall extending from said main wall and having an inner surface adapted for engaging the vacuum motor outer periphery and forming a second seal therebetween, wherein at least a portion of said inner surface is cylindrically-shaped and at least a portion of said inner surface is frusto-conically-shaped.

19. The gasket according to claim 18, wherein said gasket is molded of a rubber compound having a durometer of about 45.

20. The gasket according to claim 18, wherein said frusto-conically-shaped portion of said inner surface is between said cylindrically-shaped portion of said inner surface and said main wall.

* * * * *